United States Patent
Chen et al.

(10) Patent No.: US 6,918,045 B2
(45) Date of Patent: Jul. 12, 2005

(54) SYSTEM, METHOD AND COMPUTER PROGRAM PRODUCT FOR SELECTING A POWER MANAGEMENT MODE IN AN INFORMATION HANDLING SYSTEM

(75) Inventors: Yong Chen, Round Rock, TX (US); Thomas Shu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 583 days.

(21) Appl. No.: 10/058,588

(22) Filed: Jan. 28, 2002

(65) Prior Publication Data

US 2003/0145240 A1 Jul. 31, 2003

(51) Int. Cl.[7] .............................................. G06F 15/177
(52) U.S. Cl. ..................................................... 713/310
(58) Field of Search ......................................... 713/300

(56) References Cited

U.S. PATENT DOCUMENTS

| | | | |
|---|---|---|---|
| 6,353,885 B1 | | 3/2002 | Herzi et al. |
| 6,437,761 B1 | * | 8/2002 | Du et al. ...................... 345/11 |
| 6,789,146 B1 | * | 9/2004 | Dlugosch .................... 710/100 |

* cited by examiner

*Primary Examiner*—John R. Cottingham
(74) *Attorney, Agent, or Firm*—Haynes and Boone, LLP

(57) ABSTRACT

A power management mode selection system includes a video controller and a switching circuit. The switching circuit is configured to receive an input signal associated with an operating system processable by the system and provide a first power signal or a second power signal to the video controller in response to the input signal.

16 Claims, 3 Drawing Sheets

SYSTEM, METHOD AND COMPUTER PROGRAM PRODUCT FOR SELECTING A POWER MANAGEMENT MODE IN AN INFORMATION HANDLING SYSTEM

BACKGROUND

The disclosures herein relate generally to computer systems and more particularly to a system, method, and computer program product for selecting a power management mode in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, variety of hardware and software components that may be configured to process, store, and communicate information and may include one or more computer systems, data storage systems, and networking systems.

Information handling systems typically include one or more power management modes that allow a system to reduce power consumption under certain circumstances. For a system to take advantage of a power management mode, the system typically needs to include hardware and/or software support for the mode. Some operating systems, for example, support certain power management modes but do not support other power management modes.

It would be desirable for an information handling system to be able to select the most beneficial power management mode for that system based on the available resources of the system. Accordingly, what is needed is a system, method, and computer program product for selecting a power management mode in an information handling system.

SUMMARY

One embodiment, accordingly, provides a system that includes a video controller and a switching circuit. The switching circuit is configured to receive an input signal associated with an operating system processable by the system and provide a first power signal or a second power signal to the video controller in response to the input signal.

A principal advantage of this embodiment is that various shortcomings of previous techniques are overcome. For example, an information handling system may be able to fully utilize a power management mode supported by an operating system.

DETAILED DESCRIPTION

Figure 1:
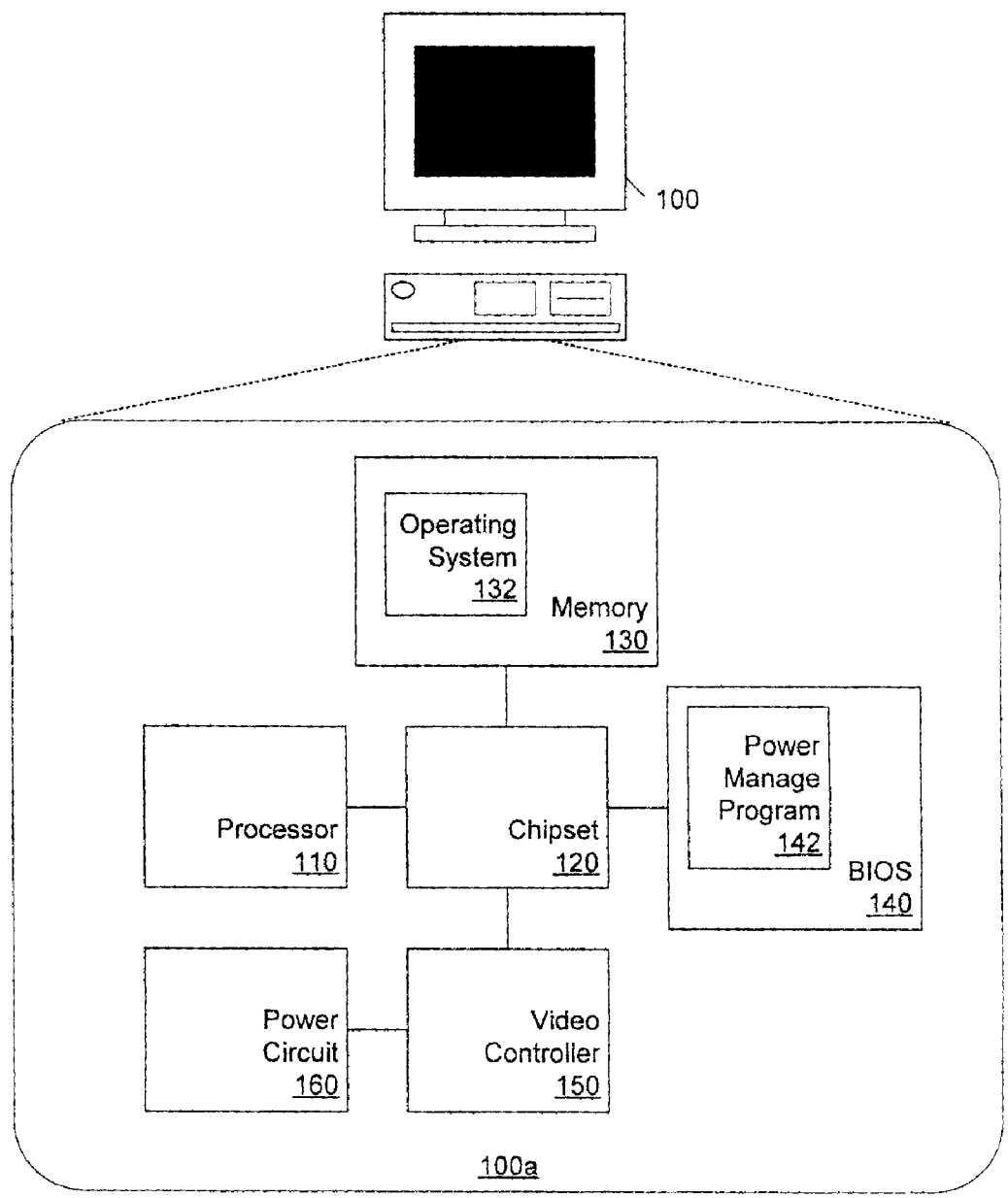
FIG. 1 is a diagram illustrating an embodiment of an information handling system that includes a system for selecting a power management mode.

FIG. 1 is a diagram illustrating an embodiment of selected portions of an information handling system 100 that includes a system for selecting a power management mode. Information handling system 100 is an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes.

System 100 includes a processor 110, a chipset 120, a memory 130, a basic input output system (BIOS) 140, a video controller 150, and a power circuit 160. Memory 130 includes an operating system 132. BIOS 140 includes a power manage program 142 and is stored in a non-volatile storage device such as a CMOS.

Information handling system 100 is a portable computer system that operates according to the Advanced Configuration and Power Interface (ACPI). The ACPI includes two power management modes: D3 hot and D3 cold. D3 hot and D3 cold are power managed states that may be used by system 100 in response to the resources that support these states being included in system 100. For example, operating system 132 may support either or both of D3 hot and D3 cold. Accordingly, the power management mode is selected according to the type of mode supported by operating system 132.

BIOS 140 includes instructions configured to cause system 100 to be initialized and operating system 132 to be booted. BIOS 140 also includes instructions configured to cause system 100 to initiate power manage program 142. Program 142 includes instructions configured to cause system 100 to select a power management mode based on the resources available in system 100. These resources include the type and version of operating system 132.

Figure 2:
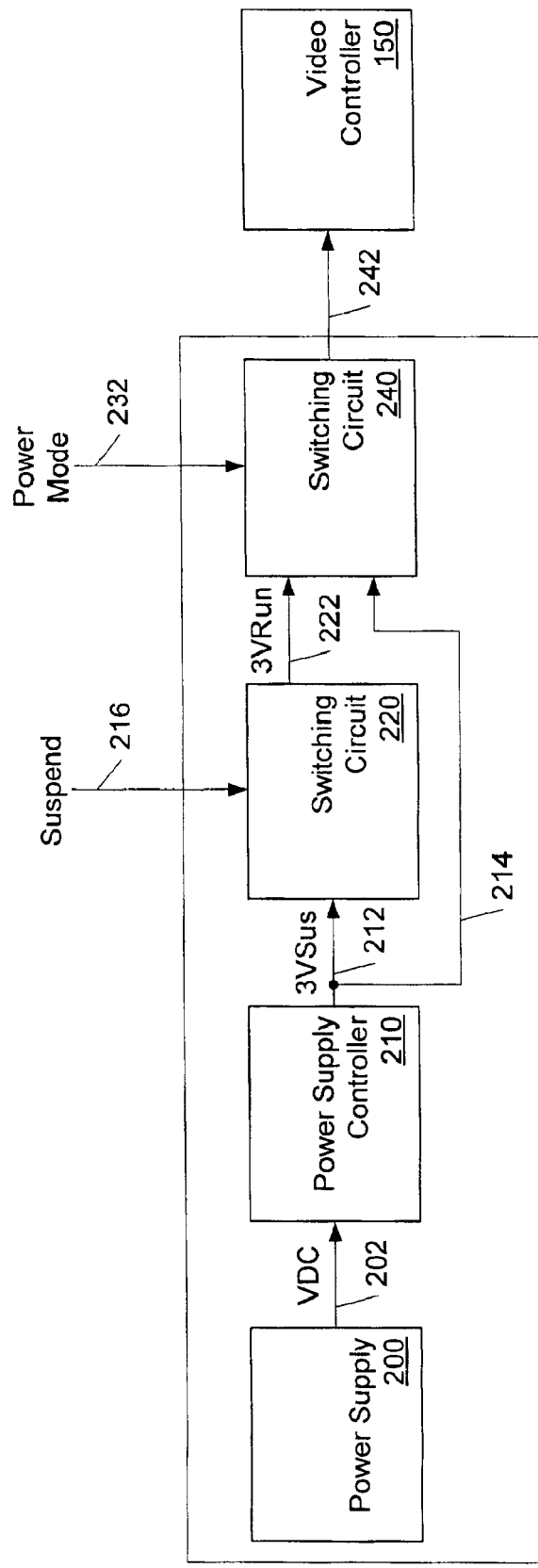
FIG. 2 is a diagram illustrating an embodiment of a system for selecting a power management mode in an information handling system.

Program 142 operates in conjunction with power circuit 160. FIG. 2 is a diagram illustrating an embodiment of power circuit 160 and video controller 150. Power circuit 160 includes a power supply 200, a power supply controller 210, a switching circuit 220, and a switching circuit 240. Power supply 200 generates a DC voltage (VDC) signal and provides the VDC signal to power supply controller 210 as indicated by an arrow 202. Power supply controller 210 converts the VDC signal into a 3 VSus signal and provides the 3 VSus signal to switching circuit 220 and switching circuit 240 as indicated by arrows 212 and 214, respectively.

Switching circuit 220 receives a suspend signal as indicated by an arrow 216 and provides a 3 VRun signal to switching circuit 240 as indicated by an arrow 222. In response to the suspend signal not indicating a suspend state, switching circuit 220 outputs the 3 VSus signal as the 3 VRun signal. In response to the suspend signal indicating a suspend state, switching circuit 220 does not output the 3 VSus signal as the 3 VRun signal.

Switching circuit 240 receives the 3 VSus signal as indicated by arrow 214 and the 3 VRun signal as indicated by an arrow 222. Switching circuit 240 also receives a power mode signal as indicated by an arrow 232. Switching circuit 240 provides either the 3 VSus signal or the 3 VRun signal to video controller 150 in response to the power mode signal as indicated by an arrow 242.

Referring to FIG. 1 and FIG. 2, program 142 causes the power mode signal to be generated and provided to switching circuit 240. The power mode signal represents a power management mode supported by system 100. In the embodiments of FIG. 1 and FIG. 2, program 142 causes the power mode signal to be generated in response to a power management mode supported by operating system 132.

Figure 3:
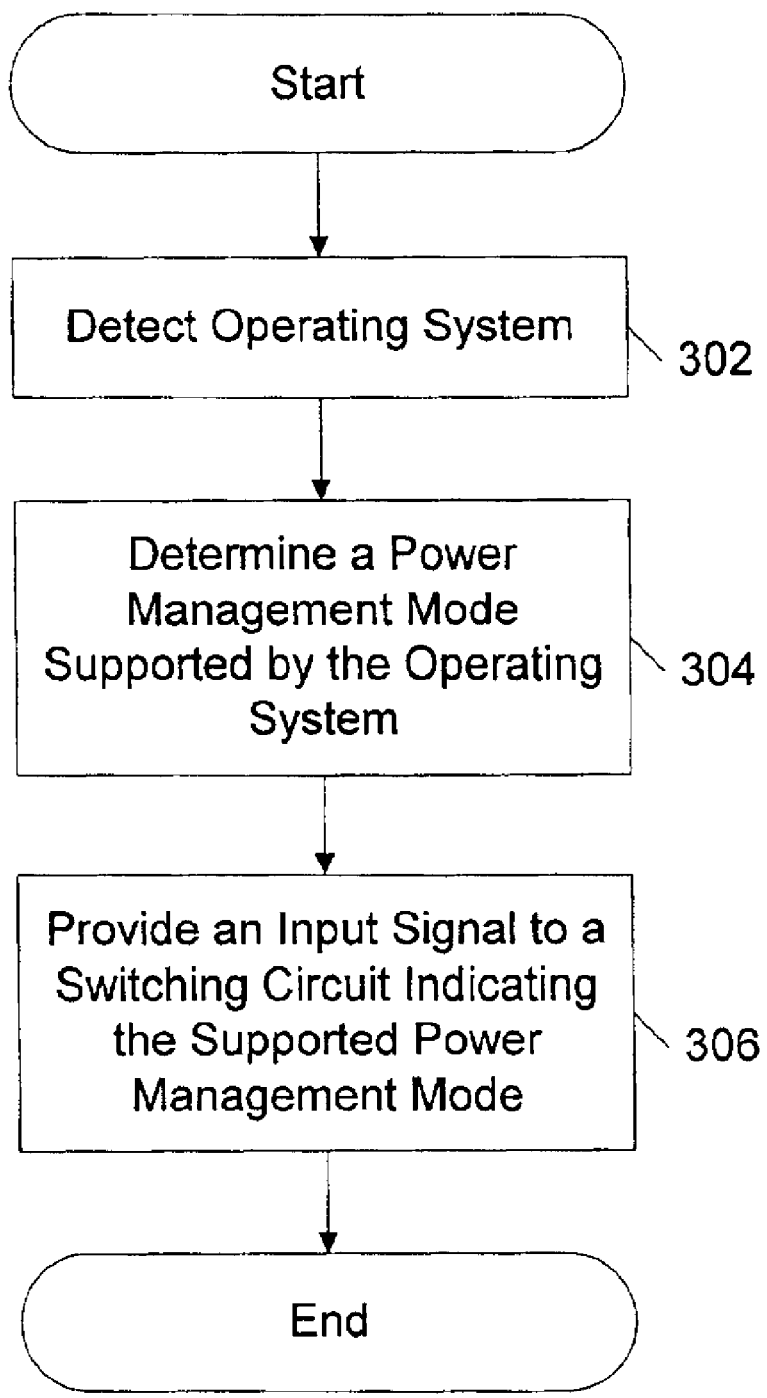
FIG. 3 is a flow chart illustrating an embodiment of a method for selecting a power management mode in an information handling system.

FIG. 3 is a flow chart illustrating an embodiment of a method for selecting a power management mode in an information handling system. Referring simultaneously to FIG. 1, FIG. 2, and FIG. 3, program 142 causes a power management mode to be selected for system 100 according to the power management mode supported by operating system 132. Program 142 causes operating system to be detected as indicated in step 302. In one embodiment, program 142 may cause operating system 132 to be detected by accessing a value in a register in system 100 that identifies operating system 132. In other embodiments, program 142 may cause operating system 132 to be detected in other ways.

After detecting operating system 132, program 142 determines a power management mode supported by operating system 132 as indicated in step 304. In one embodiment, program 142 detects the power management mode supported by operating system 132 by accessing a table or other data structure stored in system 100 that lists various operating systems and the power management mode that each operating system supports. For example, program 142 may determine that operating system 132 is the Windows® 98 operating system and may access a table to determine that Windows 98 supports the ACPI D3 cold power management mode. In other embodiments, program 142 may detect the power management mode supported by operating system 132 in other ways.

After determining a power management mode supported by operating system 132, program 142 generates the power mode signal to indicate the power management mode and provides the power mode signal to switching circuit 240 as indicated in step 306. In the embodiments of FIG. 1 and FIG. 2, the power mode signal indicates that operating system 132 supports either ACPI D3 hot or ACPI D3 cold. Accordingly, the power mode signal is associated with a power management mode which is in turn associated with an operating system. In other embodiments, the power mode signal may indicate that operating system 132 supports any number of other power management modes.

In response to receiving the power mode signal, switching circuit 240 causes either the 3 VRun signal or the 3 VSus signal to be provided to video controller 150. In particular, if the power mode signal indicates that operating system 132 supports D3 cold, then switching circuit 240 causes the 3 VRun signal to be provided to video controller 150. If the power mode signal indicates that operating system 132 supports D3 hot, then switching circuit 240 causes the 3 VSus signal to be provided to video controller 150.

In the embodiment shown in FIG. 2, switching circuit 240 comprises an FET. In other embodiments, switching circuit 240 may comprise other hardware and/or software components that provide an appropriate power signal to video controller 150 in response to the power mode signal.

BIOS 140 may also provide a user with an ability to manually select a power management mode such as D3 hot or D3 cold. The user's selection may override the power management mode determination by program 142 to cause the power mode signal to indicate the mode selected by the user. Alternatively, BIOS 140 may prevent program 142 to be executed in response to receiving a power management mode selection from a user and may generate the power mode signal accordingly. After BIOS 140 and program 142 complete their operations, BIOS 140 causes operating system 132 to be booted.

Although shown as part of BIOS 140 in the embodiment just described, program 142 may not be part of BIOS 140 in other embodiments. For example, program 142 may be part of operating system 132 or may be a separate code portion that is processed independently of BIOS 140 or operating system 132.

As noted above, BIOS 140 and program 142 are stored in a non-volatile storage device in system 100. A non-volatile storage device is one example of an apparatus from which program 142 is accessible by system 100. Other such apparatus include a hard disk drive, a floppy disk, a CD-ROM, a DVD, or another suitable stored device. In other embodiments, program 142 may be stored in other storage locations internal or external to system 100.

For purposes of these embodiments, an information handling system may include any instrumentality or aggregate of instrumentalities primarily designed to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing nit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As can be seen, the principal advantages of these embodiments are that various shortcomings of previous techniques are overcome. For example, an information handling system may be able to fully utilize a power management mode supported by an operating system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
   a video controller; and
   a power circuit coupled to the video controller and including:
      a power supply generating a DC signal to a power supply controller, the power supply controller converting the DC signal into a first signal provided to a first switching circuit and to a second switching circuit;

a suspend signal received by the first switching circuit;

a second signal provided by the first switching circuit to the second switching circuit;

the second switching circuit also receiving a power mode signal; and in response to the power mode signal, the second switching circuit providing one of the first signal and the second signal to the video controller.

2. The information handling system of claim 1, wherein the power mode signal is associated with a power management mode supported by the operating system.

3. The information handling system of claim 1, further comprising:

a program processable by the information handling system for causing the information handling system to:

generate the power mode signal; and provide the power mode signal to the second switching circuit.

4. The information handling system of claim 3, wherein the program is processable by the information handling system for causing the information handling system to:

detect the operating system; and generate the power mode signal in response to detecting the operating system.

5. The information handling system of claim 4, wherein the program is processable by the information handling system for causing the information handling system to:

detect a power management mode supported by the operating system; and generate the power mode signal in response to detecting the power management mode supported by the operating system.

6. The information handling system of claim 5, wherein the program is processable by the information handling system for causing the information handling system to:

detect the power management mode supported by the operating system using a table that lists the operating system and the power management mode supported by the operating system.

7. The information handling system of claim 3, wherein the program comprises a portion of a basic input output system (BIOS).

8. A method performed by an information handling system comprising:

providing a processor;

coupling a video controller to the processor;

coupling a power circuit to the video controller;

generating a DC signal to a power supply controller and converting the DC signal to a first signal provided to a first switching circuit and to a second switching circuit;

the first switching circuit receiving a suspend signal;

the first switching circuit providing a second signal to the second switching circuit;

the second switching circuit also receiving a power mode signal; and in response to the power mode signal, the second switching circuit providing one of the first signal and the second signal to the video controller.

9. The method of claim 8, further comprising:

the power mode signal associated with a power management mode supported by the operating system.

10. The method of claim 8, further comprising:

generating the power mode signal; and providing the power mode signal to the second switching circuit.

11. The method of claim 10, further comprising:

detecting the operating system; and generating the power mode signal in response to detecting the operating system.

12. The method of claim 11, further comprising:

detecting a power management mode supported by the operating system; and generating the power mode signal in response to detecting the power management mode supported by the operating system.

13. The method of claim 12, further comprising:

detecting the power management mode supported by the operating system using a table that lists the operating system and the power management mode supported by the operating system.

14. The method of claim 10, further comprising:

providing the first signal or the second signal to the video controller in response to the power mode signal prior to initiating the operating system.

15. The method of claim 8 wherein the first signal is a 3V Sus signal.

16. The method of claim 15 wherein the second signal is a 3V Run signal.

* * * * *